United States Patent [19]

Crawford et al.

[11] 4,340,085
[45] Jul. 20, 1982

[54] PRESSURE REGULATING DEVICE WITH DAMPING MEANS FOR PREVENTING VALVE CHATTER

[76] Inventors: Ronald H. Crawford, 21, Millard Close, Basingstoke, Hampshire; Alan W. Kent, 9, Lakeland Dr., Frimley, Camberley, Surrey, both of England

[21] Appl. No.: 142,843

[22] Filed: Apr. 22, 1980

[30] Foreign Application Priority Data

May 1, 1979 [GB] United Kingdom ............... 7915121

[51] Int. Cl.³ .......................................... F16K 15/02
[52] U.S. Cl. .................................. 137/514; 137/529; 137/543.15
[58] Field of Search ................ 137/543.15, 514, 514.3, 137/533.27, 115, 529; 251/335 A

[56] References Cited

U.S. PATENT DOCUMENTS

| | | | |
|---|---|---|---|
| 2,197,606 | 4/1940 | Birch | 137/543.15 X |
| 2,264,656 | 12/1941 | Briscoe et al. | 251/335 A |
| 2,299,079 | 10/1942 | Davis | 137/514.3 X |
| 3,556,137 | 1/1971 | Billeter | 137/543.15 |
| 3,727,406 | 4/1973 | LeFeuvre | 251/335 B |
| 3,850,405 | 11/1974 | White | 137/543.15 |

FOREIGN PATENT DOCUMENTS

2739801 3/1979 Fed. Rep. of Germany ................ 137/543.15

*Primary Examiner*—William R. Cline
*Attorney, Agent, or Firm*—Larson & Taylor

[57] ABSTRACT

A pressure regulating device comprises a chamber (22) for receiving fluid under pressure and a valve (23) associated therewith, arranged to open at a preset fluid pressure in the chamber.

In order to prevent any valve "chatter", the valve (23) comprises a valve disc (8), a bushing (9) on which the valve disc is freely mounted for sliding movement thereon, a valve seat (13) associated with the disc, and means (3) to bias the disc towards the seat against the fluid pressure, the disc and bushing being connected together by means of a flexible coupling (10) having resilient properties to accommodate the sliding movement of the disc.

10 Claims, 3 Drawing Figures

PRESSURE REGULATING DEVICE WITH DAMPING MEANS FOR PREVENTING VALVE CHATTER

FIELD OF THE INVENTION

This invention relates to a pressure regulating device.

SUMMARY OF THE INVENTION

According to the invention there is provided a pressure regulating device, comprising a chamber for receiving fluid under pressure and a valve associated therewith, arranged to open at a preset fluid pressure in the chamber, the valve comprising a valve disc, a bushing on which the valve disc is freely mounted for sliding movement thereon, a valve seat associated with the disc, and means to bias the disc towards the seat against the fluid pressure, the disc and bushing being connected together by means of a flexible coupling having resilient properties to accommodate the sliding movement of the disc.

In order to give the pressure regulating device a substantially linear operating characteristic, the biasing force of the biasing means can be made large compared with the resistance, due to the flexible coupling, to the sliding movement of the disc on the bush.

In one preferred arrangement, two such flexible couplings are provided, arranged one at each end of the valve disc. Preferably, the flexible couplings are sealing flexible couplings to seal the contacting surface regions of the valve disc and bushing from fluid in the pressure regulating device. Each flexible coupling can be in the form of a washer which is retained along its inner circumferential edge in a peripherally extending groove formed around the outer surface of the bushing, the outer circumferential edge of the washer being angled towards the valve disc and received in a peripherally extending groove in the adjacent end part of the valve disc. For convenience of assembly, the bushing can be in the form of a cylindrical sleeve which is a sliding fit on a valve stem which is biased by further biasing means, acting in the same direction as the first-mentioned biasing means, against a stop so as to be held in a predetermined position under all operating conditions of the pressure regulating device.

The first-mentioned biasing means preferably includes setting means for adjusting the preset fluid pressure at which the valve opens. Conveniently the first-mentioned biasing means takes the form of a coil spring interposed between the valve disc and a setting knob adjustably mounted on a screw-threaded portion for adjusting said preset fluid pressure. In a preferred arrangement, a sleeve, fitted around the valve stem and keyed thereto so as to permit sliding movement on the key while resisting any rotational movement thereon, is interposed between the setting knob and the coil spring.

BRIEF DESCRIPTION OF THE DRAWINGS

For a better understanding of the invention and to show how the same may be carried into effect, reference will now be made, by way of example, to the accompanying drawings in which.

DESCRIPTION OF THE PREFERRED EMBODIMENTS

Figure 1:
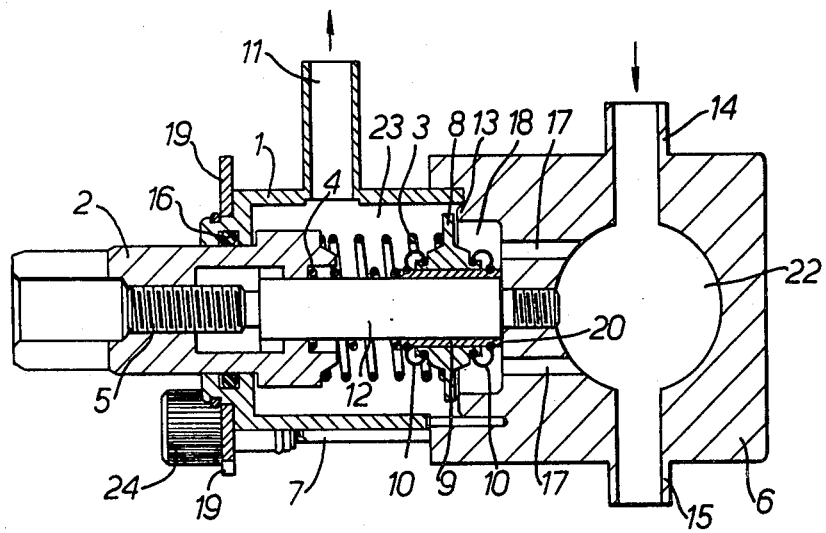
FIGS. 1 to 3 show three different embodiments, the same reference numerals in the three Figures being used to denote the same or corresponding parts.

Referring to FIG. 1, a pressure regulating device includes a body 6 defining therewithin a chamber 22 in communication with inlet and outlet pipe connectors 14, 15, respectively, and connected via passages 17 with the interior of a large-diameter blind bore 18 which serves as a pressure release chamber. By the opening of a valve 23, this chamber can be brought into communication with an exhaust pipe outlet 11 via the internal space within a generally cylindrical cover 1 which is clamped to the body 6 by means of upper and lower studs, projecting from the body 6, (only the lower stud 7 being shown) with associated screw-threaded fasteners 24 tightened against a clamping plate 19. The valve comprises a valve disc 8, a bushing in the form of a sleeve 9 on which the disc is freely mounted for sliding movement therealong, a valve seat 13 provided by an axially projecting annular shoulder on the valve body 6, and a coil spring 3 interposed between a setting knob 2 and the valve disc 8 to urge the disc into sealing contact with the valve seat 13 in the closed position of the valve. As shown, the valve disc 8 and sleeve 9 are connected together, preferably in fluid-tight fashion, by two flexible couplings 10 arranged one at each end face of the valve disc, each coupling having resilient properties (for example being made of rubber material) to allow sliding movement of the valve disc 8 on the sleeve 9. Conveniently, each coupling 10 is in the form of a washer whose inner circumferential edge is retained in a peripherally extending groove formed around the outer surface of the sleeve 9, the outer circumferential edge of the washer being angled towards the disc 8 and received in a peripherally extending groove in the adjacent end part of the valve disc.

The illustrated pressure regulating device is used more specifically as a pressure limiting valve. In this arrangement, fluid flows through the chamber 7 via the inlet and outlet pipe connections 14, 15 and the fluid pressure is communicated to the chamber 18 where it acts against the exposed face of the valve disc 8. If the fluid pressure is sufficient to overcome the closing biasing force of the valve (which force preferably is provided mainly by the coil spring 3 but to a small extent by the resilience of the flexible couplings 10), the valve disc starts to lift off the seat 13 to relieve excess fluid pressure from the valve via the internal space within the cover 1 and the exhaust pipe connection 11. The valve is self-compensating in action in the sense that if the fluid pressure starts to increase further the valve disc opens by an increased amount such that the fluid pressure within the valve remains at a substantially constant level. It is to be noted that this level can be adjusted by adjustment of the setting knob 2 which is mounted on a screw-threaded portion 5 of a valve stem 12, on which the sleeve 9 is a sliding fit for a reason to be explained hereinbelow. A rubber "O" ring 16, fitted in a groove in the cover 1, provides a fluid-tight seal between the cover 1 and setting knob 2, so as to ensure no fluid leakage can take place there. The "O" ring also provides some resistance to turning of the knob 2, thus providing some "feel" to any adjustment and preventing the setting changing if the pressure regulating device is subjected to vibration.

It is to be noted that the rubber couplings provide a degree of damping which stabilises the valve disc movement and so prevent continuous oscillations (valve "chatter") from being generated under dynamic conditions of pressure or volume flow. Moreover, since this damping is provided principally by means of the resilient properties of the couplings (since the disc 8 is freely mounted on the sleeve 9) whereas in the absence of gaiters the damping would normally be provided by frictional forces acting between the valve disc and sleeve 9, the tolerances and surface finish of the sliding surfaces are not critical. Additionally, where the flexible couplings function as sealing means, the contacting surfaces of the valve disc 8 and sleeve 9 are sealed from the fluid within the pressure regulating device, and so will be unaffected by factors associated with the fluid flow, such as moisture content.

It will be seen that the valve disc assembly (comprising sleeve 9, disc 8, and flexible couplings 10) is biased by a further coil spring 4 in the same direction as the action of the coil spring 3 against an end stop 20 provided by a part of the valve body 6 and remains in this position under every operating condition of the valve. It is to be noted that the spring 4 plays no part at all in the performance of the valve but the arrangement of the spring-biased sleeve 9 on the valve stem 12 has been found to be desirable for the purpose of facilitating assembly of the pressure regulating device. However, the assembly of the sleeve 9, valve stem and coil spring 4 could be replaced by a single bushing serving the same overall function.

Figure 2:
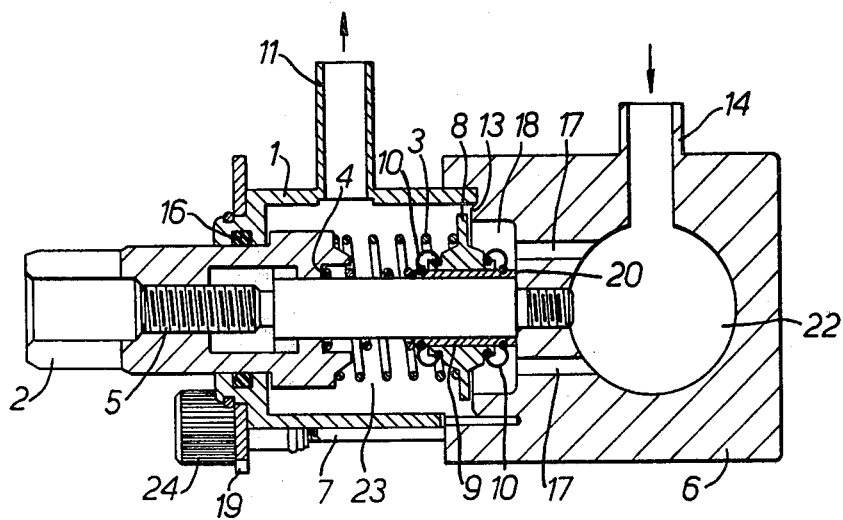

In the modification of FIG. 2, the body 6 includes only a single pipe connector 14 which serves to admit the fluid pressure to the chamber 22. The pressure regulating device then acts as a controlled restrictor so that the exhausted fluid has to pass from the relief chamber 18 through the gap between the valve disc and its associated seat 13 into the space within the valve cover 1 and from there through the exhaust pipe connector 11. In so doing, the valve gap provides a given impedance to flow which depends on the valve spring and valve disc area characteristics as in the case of the FIG. 1 embodiment. The impedance is largely independent of the volume of gas exhausted since the controlled restrictor functions in a self-balancing mode. The degree of restriction provided by a given valve depends upon the spring compression as set by the setting knob 2.

Figure 3:
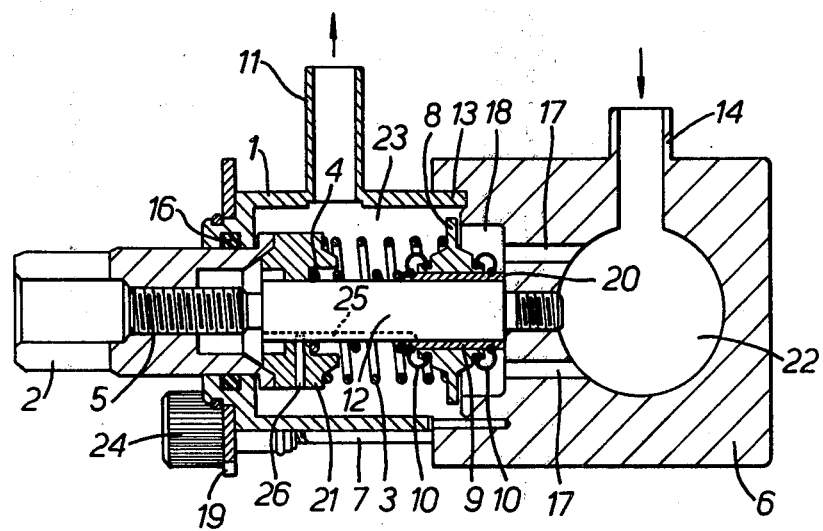

One particular problem which has arisen in the two embodiments described above is that as the setting knob is rotated, a turning movement is exerted on the valve spring which causes it to "wind-up" and so alters its characteristic until equilibrium is re-established. This difficulty is overcome in the FIG. 3 embodiment in which a keyway 25 is formed in the valve stem and a sleeve 21, interpositioned between the setting knob and coil spring 3, is keyed to the valve stem by means of a finger 26 on the sleeve which slides in the keyway. In this manner, the sleeve 21 is prevented from communicating any turning movement to the spring when the setting nut is rotated.

It is to be noted that in the case of all three embodiments, it is preferable for the biasing force exerted by the spring 3 on the valve disc 8 to be considerably larger than the resistance force to valve disc movement produced by the flexible couplings. The reason for this is that the pressure regulating device has a linear opening characteristic (i.e. the gap opening is directly proportional to flow rate therethrough).

Although the pressure regulating device is intended to be used for controlling gas (e.g. air) flows, it can alternatively be used for liquids.

We claim:
1. A pressure regulating device comprising
a chamber for receiving a fluid under pressure;
an outlet for the fluid; and
a valve assembly disposed between said chamber and said outlet which opens automatically when the pressure in said chamber exceeds a predetermined value, said valve assembly comprising:
a valve casing;
a valve stem which is fixed in position within said valve casing;
a bushing mounted about said valve stem for free axial sliding movement thereon;
a valve disc mounted about said bushing for axial sliding movement thereon;
a valve seat adjacent the end of said valve stem nearest said chamber;
biasing means for urging said valve disc towards engagement with said valve seat against the pressure of fluid in said chamber; and
a flexible and resilient coupling arrangement which interconnects said valve disc and said bushing so as to accomodate the axial sliding movement therebetween while also providing damping of the movement of said valve disc relative to said bushing to prevent valve chatter.

2. A pressure regulating device according to claim 1, wherein the biasing means includes setting means for adjusting the preset fluid pressure at which the valve opens.

3. A pressure regulating device according to claim 2, wherein the biasing means takes the form of a coil spring interposed between the valve disc and a setting knob adjustably mounted on a screw-threaded portion for adjusting said preset fluid pressure.

4. A pressure regulating device according to claim 3, wherein a sleeve, fitted around the valve stem and keyed thereto so as to permit sliding movement on the key while resisting any rotational movement thereon, is interposed between the setting knob and the coil spring.

5. A pressure regulating device according to claim 1, wherein the bush is in the form of a cylindrical sleeve which is a sliding fit on the valve stem and which is biased by further biasing means, acting in the same direction as the first-mentioned biasing means, against a stop so as to be held in a predetermined position under all operating conditions of the pressure regulating device.

6. Apparatus according to claim 1, said biasing means having a large biasing force as compared with the resistance to the sliding movement of the disc on the bushing.

7. A pressure regulating device according to claim 6, wherein the flexible coupling means comprises two flexible coupling members arranged one at each end of the valve disc.

8. A pressure regulating device according to claim 7, wherein said flexible coupling members seal the contacting surface regions of the valve disc and bushing from fluid in the pressure regulating device.

9. A pressure regulating device according to claims 7 or 8 wherein the longitudinal extent of the bushing is greater than that of the valve disc, and wherein the flexible coupling members are in the form of flexible washers positioned between adjacent ends of the bushing and the valve disc.

10. A pressure regulating device according to claim 9 wherein each flexible coupling member is retained along its inner circumferential edges in a peripherally extending groove formed around the outer surface of the bushing, the outer circumferential edge of the washer means angled towards the valve disc and received in a peripherally extending groove in an adjacent end part of the valve disc.

* * * * *